(12) United States Patent
Tateishi et al.

(10) Patent No.: US 6,296,587 B1
(45) Date of Patent: Oct. 2, 2001

(54) SEAMED ENDLESS BELT

(75) Inventors: Akira Tateishi; Seiichi Katoh; Ayumu Kawashima, all of Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/434,460

(22) Filed: Nov. 5, 1999

(30) Foreign Application Priority Data

Nov. 10, 1998 (JP) .................................................. 10-319280

(51) Int. Cl.[7] ........................................................ F16G 3/10
(52) U.S. Cl. ........................... 474/253; 474/237; 474/254
(58) Field of Search .................................... 474/237, 238, 474/253, 254

(56) References Cited

U.S. PATENT DOCUMENTS

| | | | |
|---|---|---|---|
| 2,792,318 | * | 5/1957 | Welch ..................................... 428/60 |
| 5,487,707 | * | 1/1996 | Sharf et al. ........................... 474/253 |
| 5,721,032 | * | 2/1998 | Parker et al. ........................... 428/57 |

FOREIGN PATENT DOCUMENTS

-A-8-99737  4/1996  (JP) .

\* cited by examiner

*Primary Examiner*—David A. Bucci
*Assistant Examiner*—Vicky A. Johnson
(74) *Attorney, Agent, or Firm*—Oliff & Berridge, PLC

(57) ABSTRACT

Disclosed herein is a flexible seamed endless belt having high strength and good smoothness, in which the seamed portion is as thick as the other part of the belt. The seamed endless belt is formed from a flexible belt-like member by joining its ends together. The belt-link member has end structures which can be engaged with each other such that the resulting seamed portion is unseparable in the advancing direction thereof. The seamed portion is covered with a cured film formed by curing a resin composition containing a curable resin. The curable resin may be a thermosetting resin and the cured film may be formed by heating the resin composition.

17 Claims, 3 Drawing Sheets

SEAMED ENDLESS BELT

BACKGROUND OF THE INVENTION

1. Field of the Invention

The present invention relates to a flexible seamed endless belt. More particularly, the present invention relates to a flexible seamed endless belt that has a seamed portion as thick as the other portion and has high strength and good smoothness.

2. Description of the Related Art

Endless belts are widely used for transmission of rotary motion from power sources such as electric motors. They are usually formed from a flat elongated rectangular or parallelogramatic material by joining its opposing ends. Joining may be accomplished by bonding, sewing, or stapling. The resulting joints often present steps and mechanical discontinuity which impair accurate transmission of rotary motion. Consequently, they cannot be used as photoreceptors, intermediate sheets, image transport devices, fusing members, transfix devices, and the like in electrostatographic and electrographic image forming and processing machines. These machines need an endless belt free of joint or an endless belt with a specially designed joint which has no adverse effect on accurate transmission of rotary motion.

Unfortunately, joint-free endless belts need a complex technology which leads to high production cost and hampers mass production. This is true with large endless belts.

Improvements have been made in joined endless belts such that joints substantially do not affect accurate transmission of rotary motion. One way to achieve this object was to make butt joints by heat fusion bonding, ultrasonic fusion bonding, or adhesive bonding.

The disadvantage of endless belts produced in this manner is that the joint is not sufficiently strong and hence liable to break due to repeated flexural and frictional stresses. This leads to their short lives.

There is disclosed in Japanese Patent Laid-open No. 8-99737 (1996) a new endless belt which has been contrived to tackle the above-mentioned problem. This endless belt is formed from a flat material whose opposing ends have engageable structures to join them together. The resulting joint is greatly improved in strength. Unfortunately, this technology, which employs a solid thermoplastic adhesive to make the joint, cannot be applied to endless belts made of thermally vulnerable materials.

SUMMARY OF THE INVENTION

The present invention, which was completed to address the above-mentioned problem, provides a flexible seamed endless belt that has a seamed portion as thick as other portion, produces substantially no adverse effect on accurate transmission of rotary motion, permits a wide selection of adhesives applicable to it, possesses high strength and good smoothness, and resists repeated flexural and frictional stresses it encounters during its use.

The seamed endless belt of the present invention, formed from a flexible belt-like member, has engaging structures at both ends of the belt-like member, which are unseparable in an advancing direction of the belt when the structures are engaged with each other. The belt also has a seamed portion formed by engaging structures engaged with each other, and a cured film made of a resin composition containing a curable resin, which covers the seamed portion.

In the seamed endless belt, the curable resin may be a thermosetting resin and the cured film may be formed by heating the resin composition.

The curable resin may be a radiation-curable resin and the cured film may be formed by exposing the resin composition to a radiation, alternatively.

The cured film may be formed by at least either heating the resin composition on the seamed portion or pressing the resin composition against the seamed portion.

The cured film may alternatively be formed on a base material that is peeled off and removed from the film after forming of the film is completed.

In the seamed endless belt, the resin composition may be flowable at a normal temperature and the cured film may be formed by applying the resin composition to the seamed portion and curing it. The resin composition may contain a thermoplastic resin.

Another seamed endless belt according to the present invention, formed from a flexible belt-like member having a tensile modulus of elasticity Tb includes engaging structures at both ends of the belt-like member, which are unseparable in an advancing direction of the belt when the structures are engaged with each other. The belt also includes a seamed portion formed by engaging structures being engaged with each other, and a reinforcing film which covers the seamed portion and has a tensile modulus of elasticity Ta satisfying Tb>2Ta.

Another seamed endless belt according to the present invention, formed from a flexible belt-like member, has engaging structures at both ends of the belt-like member, which are unseparable in an advancing direction of the belt when the structures are engaged with each other. The belt also has a seamed portion formed by the engaging structures being engaged with each other, and a reinforcing film which covers the seamed portion, wherein a T-peel adhesion strength between the belt-like member and the reinforcing film is not less than 50 gf/cm.

BRIEF DESCRIPTION OF THE DRAWINGS

Preferred embodiments of a seamed endless belt according to the present invention are now described in detail based on the following drawings.

DESCRIPTION OF THE PREFERRED EMBODIMENTS

Figure 1:
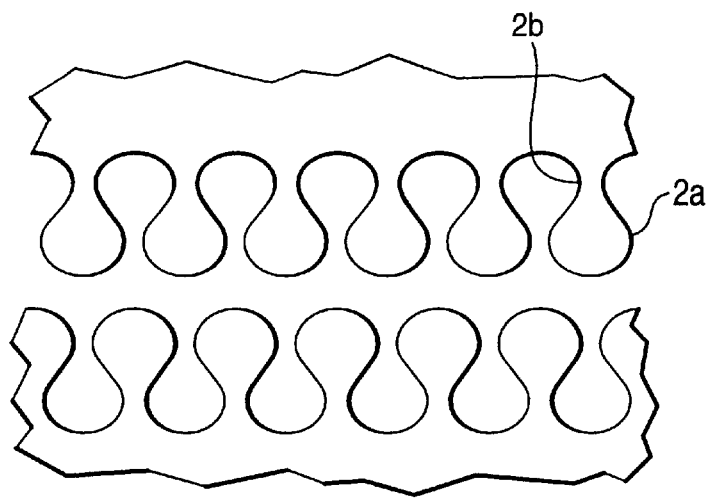
FIG. 1 is a partly cutaway schematic diagram showing the first embodiment of the engaging structure constituting the seamed portion in the seamed endless belt of the present invention.

The present invention is concerned with a seamed endless belt formed from a flexible belt-like member by joining its ends together, said belt-like member having end structures which can be engaged with each other such that the resulting seamed portion is unseparable in the longitudinal direction thereof. The first embodiment of the present invention is characterized in that the seamed portion is covered with a film formed by curing a resin composition containing a curable resin. The second embodiment of the present invention is characterized in that the seamed portion is covered with a reinforcing film which satisfies the condition of Tb>2Ta, where Tb denotes the tensile modulus of the belt-like member and Ta denotes the tensile modulus of the reinforcing film. The third embodiment of the present invention is characterized in that the seamed portion is covered with a reinforcing film, with a T-peel bond strength between the reinforcing film and the belt-like member being greater than 50 gf/cm.

The above-mentioned belt-like member is not specifically restricted in material, shape, construction, and size so long as it is flexible, and it may be selected according to individual objects. The material may be selected from any known ones, such as natural rubber, synthetic rubber, elastomer, and mixtures thereof. The shape may be selected from any belt-like ones such as rectangles and parallelograms. The construction may be single-layer construction or multi-layer construction. A composite product of more than one construction is also acceptable. The size may be properly selected according to the use and object of the endless belt.

The belt-like member has end structures which can be engaged with each other such that the resulting seamed portion is unseparable in the longitudinal direction thereof.

The end structures formed at both ends of the belt-like member are not specifically restricted so long as they can be engaged with each other such that the resulting seamed portion is unseparable in the longitudinal direction of the belt-like member. They may be properly selected according to the object. Their examples are shown in FIGS. 1 to 4. The first one shown in FIG. 1 looks like a jigsaw puzzle pattern consisting of round projections 2a and narrow necks 2b. The second one shown in FIG. 2 looks like a jigsaw puzzle pattern consisting of semicircular projections 2a and narrow necks 2b. The third one shown in FIG. 3 looks like a jigsaw puzzle pattern consisting of inverted trapezoidal projections 2a. The fourth one shown in FIG. 4 looks like a jigsaw puzzle pattern consisting of tooth-like projections 2d, each having a small projection 2c and a notch 2e which engage with each other. Incidentally, the above-mentioned jigsaw puzzle pattern may be referred to as "mutually engaging element" hereinafter.

The endless belt is formed when the ends of the belt-like member are joined together, with the engaging end structures engaged with each other and the belt-like member not twisted. The engaging end structures form a seamed portion which is unseparable in the longitudinal direction of the belt-like member, because they are provided with engageable projections. Consequently, the seamed endless belt of the present invention is characterized by its seamed portion which is superior in strength and durability.

First Embodiment

The first embodiment of the seamed endless belt has the seamed portion covered with a cured film of a resin composition containing a curable resin. The resin composition is not specifically restricted in its make-up unless it harms the object of the present invention. An adequate one should be selected in consideration of adhesion to the seamed portion, quality of cured film and forming efficiently. If adhesion between the resin composition and the seamed portion is weak, the cured film will peel off. If adhesion between the resin composition and the seamed portion is excessively strong, the cured film will be poor in quality and forming efficiency.

The resin composition in the present invention should be one which improves in physical properties (such as strength, elastic modulus, and adhesion) upon heating, pressing; or irradiation. The resin composition may contain, in addition to said curable resin, any known thermoplastic resin (such as phenoxy resin) and any other components.

Such other components are not specifically restricted. Adequate ones may be chosen according to the object. They may be pigments (if the resin composition needs a good appearance), flame retardants (if the resin composition needs flame retardance), and electrically conducting fillers (if the resin composition needs electrical conductivity).

The above-mentioned curable resin includes, for example, thermosetting resins and radiation-curable resins.

The above-mentioned thermosetting resin is not specifically restricted. It may be selected from any known ones, such as epoxy resin, urethane resin, phenolic resin, and polyimide resin.

The above-mentioned radiation-curable resin is not specifically restricted. It may be selected from any known ones, such as radiation-curable acrylic resin and radiation-curable epoxy resin.

They may be used alone or in combination with one another.

According to the present invention, the seamed portion is covered with a cured film which is formed from the resin composition containing a curable resin as mentioned above. This offers the following advantage.

The curable resin cures to produce three-dimensional crosslinks in the resin composition, with the result that the cured film increases in strength and flexural resistance. The seamed portion covered with such a cured film withstands repeated flexural stress and retains high strength. This contributes to the long life of the seamed endless belt.

The above-mentioned thermosetting resin permits more varied ways of forming the cured film than the thermoplastic resin used alone. In the case where the thermoplastic resin is used alone, the resin composition containing it has to be heated and then cooled under pressure. This needs an expensive apparatus. On the other hand, the resin composition containing the thermosetting resin obviates the necessity of this cooling step. This means that the process can be carried out using a heat-bonding apparatus of simple structure or a chamber capable of heating only. In addition, the radiation-curable resin can be cured at normal temperature within several seconds to tens of seconds. Therefore, radiation curing is suitable for mass production and can be adequately applied to the belt-like member even though it is made of a thermally vulnerable material. Thus it permits a wide selection of materials.

The resin composition containing a curable resin may be formed into a cured or uncured film (self-supporting film). This film is bonded to the seamed portion to cover it. An uncured film may be cured when the seamed portion is made or after the seamed portion has been made. In addition, the film should have at least one tacky surface. This offers the advantage that the film is not displaced when it is arranged on the seamed portion.

The bonding method is not specifically restricted. An adequate selection should be made according to the object.

A desirable bonding method is to heat and/or press the film on the seamed portion. Heating with pressing may be adequately applied to a film which softens or melts upon heating.

The above-mentioned film may be formed on an adequate base material which permits the film to be released easily. In this case, the base material is peeled off and removed from the film after the film has been cured on the seamed portion.

The curing of the film may be accomplished on the seamed portion. In this case, a resin composition (in the form of liquid or paste) which flows at normal temperature is prepared from, for example, an epoxy resin dissolved in a solvent. This resin composition (in liquid or molten state) is spread thin on the seamed portion by coating or printing. Subsequently the film is cured, so that the seamed portion is covered with the cured film.

The printing or coating method is not specifically restricted. Any known method may be used. Concrete examples are given below.

A plate having a few or many holes in a region corresponding to the area to be coated is placed on the seamed portion. The resin composition is squeezed by a rubber blade out of the plate, so that the resin composition that has passed through the plate is transferred and coated onto the seamed portion.

A plate with a concave is prepared. This concave is filled with the resin composition. A rubber member is pressed against the concave so that the resin composition is transferred from the concave to the rubber member. The rubber member is pressed against the seamed portion, so that the resin composition is transferred and coated onto the seamed portion.

A brush is soaked with the resin composition, and the seamed portion is rubbed with the brush, so that the resin composition is transferred and coated onto the seamed portion.

A cylindrical container with an outlet is filled with the resin composition. The resin composition is discharged from the outlet under pressure, with the outlet positioned near the seamed portion. While discharging, the cylindrical container is moved, so that the resin composition is transferred and coated onto the seamed portion.

The method for curing the resin composition is not specifically restricted. An adequate choice should be made according to the kind of the curable resin contained in the resin composition. If the curable resin is a thermosetting resin, curing may be accomplished by heating. If the curable resin is a radiation-curable resin, curing may be accomplished by irradiation with light, microwave, X-rays, gamma rays, electron beams, or the like.

According to the present invention, the seamed portion is covered with the cured film as mentioned above. At the time of covering, the raw material of the cured film should preferably enter at least partly the interstices between the engaging structures of the seamed portion. In other words, such interstices should preferably be filled with the above-mentioned resin composition. For this reason, the resin composition or the cured film thereof should preferably be slightly flowable when it covers the seamed portion.

Second Embodiment

The second embodiment of the seamed endless belt has the seamed portion covered with a reinforcing film which satisfies the condition of Tb>2Ta, where Tb denotes the tensile modulus of the belt-like member and Ta denotes the tensile modulus of the reinforcing film.

If the tensile modulus Ta of the reinforcing film is smaller than one half of the tensile modulus Tb of the belt-like member, that is, if the condition of Tb>2Ta is satisfied, the seamed portion of the endless belt is superior in strength and durability, which contributes to the life of the endless belt.

If the above-mentioned condition of Tb>2Ta is not satisfied, the reinforcing film will peel off from the belt-like member soon after the endless belt has been put into actual operation. Probably, peeling would occur due to flexural stresses repeatedly applied to the bond interface during operation. Therefore, the second seamed endless belt should be designed as follows with the above-mentioned condition in mind. If the resin composition is one which contains a thermoplastic resin, the modulus of the resin composition itself should be smaller than the modulus of the belt-like member. If the resin composition is one which contains a thermosetting resin, the modulus of the resin composition after curing should be smaller than the modulus of the belt-like member.

In the second embodiment of the seamed endless belt, the reinforcing film may be the same one as that used in the first seamed endless belt.

Third Embodiment

The third embodiment of the seamed endless belt has the seamed portion covered with a reinforcing film, with a T-peel bond strength between the reinforcing film and the belt-like member being greater than 50 gf/cm.

The seamed endless belt will be suitable for special use which needs accurate transmission. In other words, it may be used as a photoreceptor, intermediate sheet, image transport device, fusing member, transfix device, and the like in electrostatographic and electrographic image forming and processing machines.

The T-peel bond strength mentioned above is a bond strength between the reinforcing film and the belt-like member which is measured using a T-type peel testing machine defined in JIS K6854. If the T-peel strength is greater than 50 gf/cm, the seamed portion of the endless belt is superior in strength and durability, which contributes to the life of the endless belt.

Therefore, the third embodiment of the seamed endless belt should be designed as follows with the above-mentioned condition in mind. If the reinforcing film is formed from the resin composition which contains a thermoplastic resin, the T-peel strength of the resin composition itself and the belt-like member should be greater than 50 gf/cm. If the reinforcing film is formed from the resin composition which contains a thermosetting resin, the T-peel strength of the resin composition after curing and the belt-like member should be greater than 50 gf/cm.

In this embodiment, the reinforcing film may be the same one as that used in the first seamed endless belt.

The invention will be described in more detail with reference to the following examples, which are not intended to restrict the scope thereof.

EXAMPLE 1

A 15-cm wide sheet of polyimide resin was used as the belt-like member mentioned above. Both ends of this sheet were mechanically cut using a die cutter so that a jigsaw puzzle pattern was formed as shown in FIG. 1. This pattern consists of round projections 2*a* and narrow necks 2*b*. The die-cut ends can be engaged with each other in such a way that they are not separated in the longitudinal direction of the belt-like member. In Example 1, this jigsaw puzzle pattern is used for the engaging structures.

Both ends of the sheet were engaged with each other, with the sheet not twisted, so that the sheet formed an endless belt.

Figure 5:
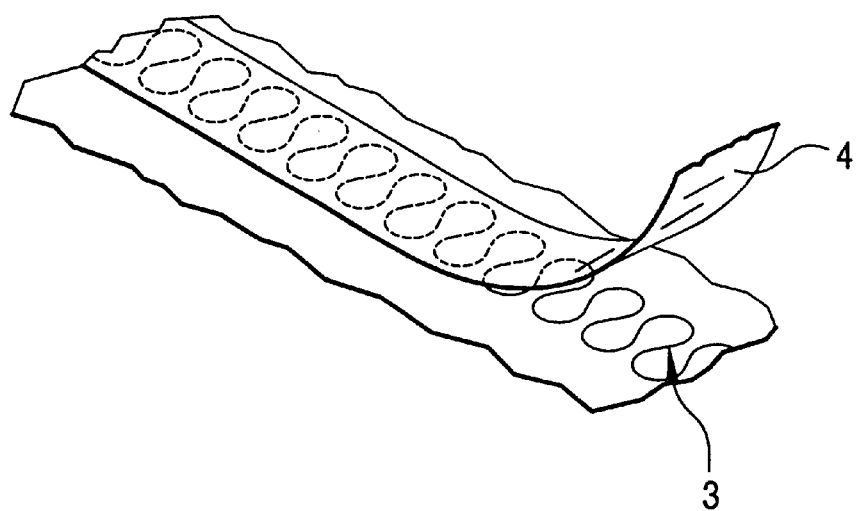
FIG. 5 is a schematic diagram showing a film of thermosetting epoxy resin which is placed on the seamed portion.

The seamed portion of the endless belt was placed on the lower jaw of a hot press of cantilever type. On the seamed portion 3 was placed a green film 4 of thermosetting epoxy resin (TB1650 from Three-Bond Co., Ltd.) which is integrated with a release paper, as shown in FIG. 5. The film was heated at about 120° C. for about 60 seconds under slight pressure so that the thermosetting epoxy material adhered to the seamed portion. Subsequently, with the release paper removed, the film was heated at about 180° C. for about 10 minutes under a pressure of about 2.5 kgf/cm$^2$. Thus the film of the thermosetting epoxy material was cured, and the seamed portion was covered with the cured film of the thermosetting epoxy material.

Figure 6:
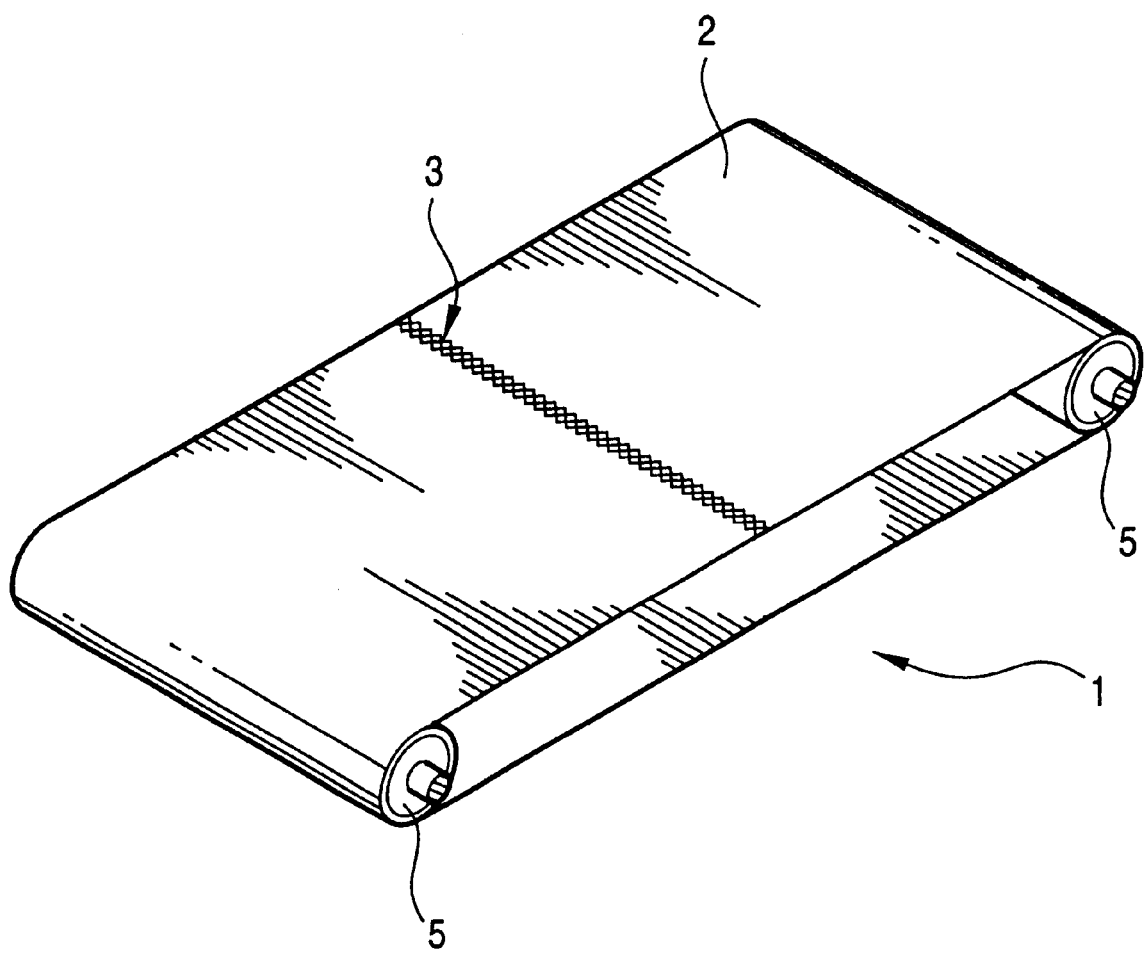
FIG. 6 is a schematic diagram showing the seamed endless belt held on pulleys.

The thus obtained endless belt, with its seamed portion covered with the cured film of the thermosetting epoxy material, was held on two pulleys 5 with a tension of 5 kg, as shown in FIG. 6. One of the two pulleys 5 was turned so as to drive the endless belt 1. A urethane rubber plate was arranged such that the seamed portion 3 rubs against it once each time the endless belt 1 turns. The endless belt 1 was turned 400,000 times and then removed from the pulleys 5. The seamed portion 3 was examined. The cured film was found intact, without peeling, wear, and breakage.

The seamed portion 3 was measured for breaking strength. The breaking strength was about 3 kgf/cm, which is equal to the value measured before operation. The T-peel strength between the polyimide resin sheet and the cured film was 250 gf/cm. The tensile modulus of the polyimide resin sheet was 200 kgf/mm$^2$. The tensile modulus of the cured film was 10 kgf/mm$^2$.

EXAMPLE 2

Figure 2:
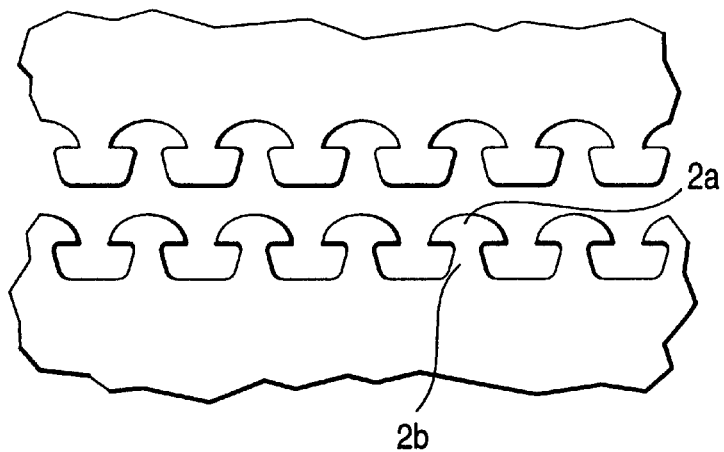
FIG. 2 is a partly cutaway schematic diagram showing the second embodiment of the engaging structure constituting the seamed portion in the seamed endless belt of the present invention.
Figure 3:
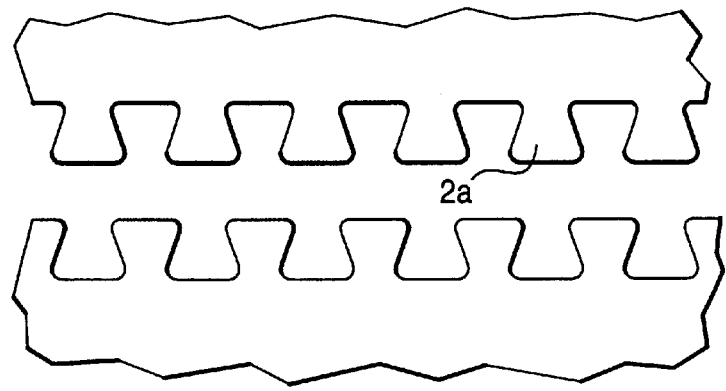
FIG. 3 is a partly cutaway schematic diagram showing the third embodiment of the engaging structure constituting the seamed portion in the seamed endless belt of the present invention.
Figure 4:
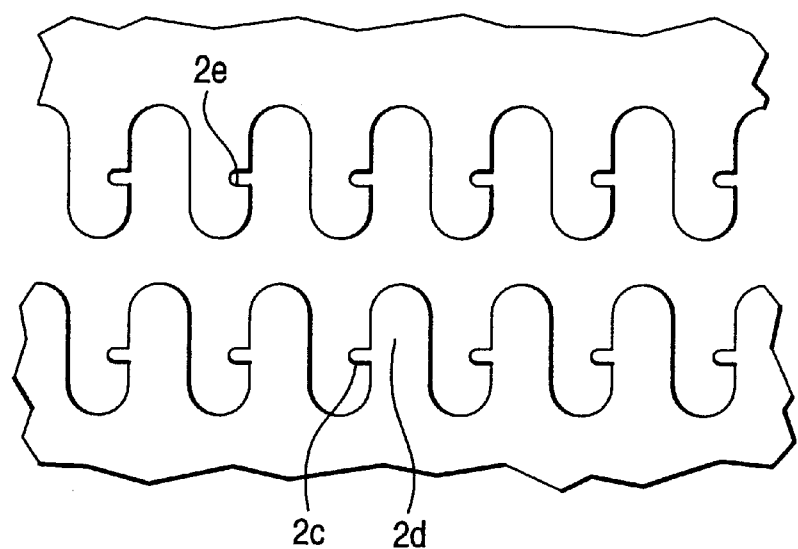
FIG. 4 is a partly cutaway schematic diagram showing the fourth embodiment of the engaging structure constituting the seamed portion in the seamed endless belt of the present invention.

A 15-cm wide sheet of polyimide resin was used as the belt-like member mentioned above. Both ends of this sheet were mechanically cut using a die cutter so that a jigsaw puzzle pattern was formed as shown in FIG. 2. This pattern consists of semicircular projections 2a and narrow necks 2b. The die-cut ends can be engaged with each other in such a way that they are not separated in the longitudinal direction of the belt-like member. In Example 2, this jigsaw puzzle pattern is used for the engaging structures.

Both ends of the sheet were engaged with each other, with the sheet not twisted, so that the sheet formed an endless belt.

The seamed portion of the endless belt was placed on the base of a UV light curing apparatus. The seamed portion was coated by screen printing with a UV light curable adhesive (TB3027B from Three-Bond Co., Ltd.). The adhesive was irradiated with UV light for curing. Thus the seamed portion was covered with a cured film of the UV light curable adhesive.

The thus obtained endless belt, with its seamed portion covered with the cured film of the UV light curable adhesive, was evaluated in the same way as in Example 1.

After turning 400,000 times, the seamed portion 3 was examined. The cured film was found intact, without peeling, wear, and breakage. The seamed portion was measured for breaking strength. The breaking strength was about 3 kgf/cm, which is equal to the value measured before operation. The T-peel strength between the polyimide resin sheet and the cured film was 100 gf/cm. The tensile modulus of the polyimide resin sheet was 200 kgf/mm . The tensile modulus of the cured film was 10 kgf/mm$^2$.

COMPARATIVE EXAMPLE 1

The same procedure as in Example 1 was repeated except that the film of thermosetting epoxy resin (covering the seamed portion) was replaced by that of thermoplastic polyester and the heating time for bonding was changed from 10 minutes to 5 minutes.

After turning 400,000 times, the seamed portion was examined. The cured film gave a sign of peeling, wear, and breakage. The T-peel strength between the polyimide resin sheet and the cured film of the polyester was 20 gf/cm. The tensile modulus of the polyimide resin sheet was 200 kgf/mm$^2$. The tensile modulus of the cured film of the polyester was 100 kgf/mm$^2$.

What is claimed is:

1. A seamed endless flexible belt having a tensile modulus of elasticity Tb, comprising:
   engaging structures at both ends of the belt, which are unseparable in an advancing direction of the belt when the structures are engaged with each other;
   a seamed portion formed by the engaging structures being engaged with each other; and
   a reinforcing film which covers the seamed portion and has a tensile modulus of elasticity Ta satisfying Tb>2Ta.

2. The seamed endless flexible belt as recited in claim 1 wherein the reinforcing film is a cured film made of a resin composition containing a curable resin.

3. The seamed endless flexible belt as recited in claim 1 wherein a T-peel adhesion strength between the belt-like member and the reinforcing film is not less than 50 gf/cm.

4. The seamed endless flexible belt as set forth in claim 2, wherein the curable resin is a thermosetting resin and the cured film is formed by heating the resin composition.

5. The seamed endless flexible belt as set forth in claim 2, wherein the curable resin is a radiation—curable resin and the cured film is formed by exposing the resin composition to a radiation.

6. The seamed endless flexible belt as set forth in claim 2, wherein the cured film is formed by at least either heating the resin composition on the seamed portion or pressing the resin composition against the seamed portion.

7. The seamed endless flexible belt as set forth in claim 6, wherein the cured film is formed on a base material that is peeled off and removed from the film after forming of the film is completed.

8. The seamed endless flexible belt as set forth in claim 2, wherein the resin composition is flowable at a normal temperature and the cured film is formed by applying the resin composition to the seamed portion and curing thereof.

9. The seamed endless flexible belt as set forth in claim 2, wherein the resin composition contains a thermoplastic resin.

10. A seamed endless flexible belt, comprising:
    engaging structures at both ends of the belt, which are unseparable in an advancing direction of the belt when the structures are engaged with each other;
    a seamed portion formed by the engaging structures being engaged with each other; and
    a reinforcing film which covers the seamed portion, wherein a T-peel adhesion strength between the belt-like member and the reinforcing film is not less than 50 gf/cm.

11. The seamed endless flexible belt as recited in claim 10 wherein the reinforcing film is a cured film made of a resin composition containing a curable resin.

12. The seamed endless flexible belt as set forth in claim 11, wherein the curable resin is a thermosetting resin and the cured film is formed by heating the resin composition.

13. The seamed endless flexible belt as set forth in claim 11, wherein the curable resin is a radiation-curable resin and the cured film is formed by exposing the resin composition to a radiation.

14. The seamed endless flexible belt as set forth in claim 11, wherein the cured film is formed by at least either heating the resin composition on the seamed portion or pressing the resin composition against the seamed portion.

15. The seamed endless flexible belt as set forth in claim 14, wherein the cured film is formed on a base material that is peeled off and removed from the film after forming of the film is completed.

16. The seamed endless flexible belt as set forth in claim 11, wherein the resin composition is flowable at a normal temperature and the cured film is formed by applying the resin composition to the seamed portion and curing thereof.

17. The seamed endless flexible belt as set forth in claim 11, wherein the resin composition contains a thermoplastic resin.

* * * * *